US008955051B2

(12) United States Patent
Marzii

(10) Patent No.: US 8,955,051 B2
(45) Date of Patent: Feb. 10, 2015

(54) SIGNALLING METHOD FOR COMMUNICATION NETWORKS, CORRESPONDING NETWORK, DEVICES AND COMPUTER PROGRAM PRODUCT

(75) Inventor: Andrea Marzii, Bergamo (IT)

(73) Assignee: Nokia Siemens Networks Oy, Espoo (FI)

( * ) Notice: Subject to any disclaimer, the term of this patent is extended or adjusted under 35 U.S.C. 154(b) by 855 days.

(21) Appl. No.: 12/670,896

(22) PCT Filed: Jul. 28, 2008

(86) PCT No.: PCT/EP2008/059858
§ 371 (c)(1),
(2), (4) Date: Mar. 19, 2010

(87) PCT Pub. No.: WO2009/016148
PCT Pub. Date: Feb. 5, 2009

(65) Prior Publication Data
US 2010/0205654 A1    Aug. 12, 2010

(30) Foreign Application Priority Data
Jul. 27, 2007    (EP) ..................................... 07425476

(51) Int. Cl.
*G06F 15/16* (2006.01)
*H04W 8/12* (2009.01)
*H04W 80/04* (2009.01)
*H04W 36/00* (2009.01)

(52) U.S. Cl.
CPC ................ *H04W 8/12* (2013.01); *H04W 80/04* (2013.01); *H04W 36/0033* (2013.01); *H04W 36/0011* (2013.01)

USPC ...................................... 726/4; 726/3; 726/12

(58) Field of Classification Search
CPC .............. H04W 8/12; H04W 36/0011; H04W 36/0033; H04W 80/04
USPC ............................ 726/3, 4, 12; 370/329, 331
See application file for complete search history.

(56) References Cited

U.S. PATENT DOCUMENTS

2004/0260752 A1    12/2004    Chandra et al. ............... 709/200

FOREIGN PATENT DOCUMENTS

WO    WO 2006/130354 A1    12/2006

OTHER PUBLICATIONS

WiMAX Forum: WiMAX End-to-End Network Systems Architecture—(Stage 2: Architecture Tenets, Reference Model and Reference Points), Dec. 15, 2005—Draft, pp. 1-242, XP002442962, section 6, section 7.8, figures 7-56-7-87.

*Primary Examiner* — Baotran N To
(74) *Attorney, Agent, or Firm* — Harrington & Smith

(57) ABSTRACT

A method is proposed, for use e.g. in the context of WiMAX networks supporting the CMIPv6 function, for allowing the ASN-GW to become aware of the status of a control procedure, the CMIPv6 mobility binding procedure. The ASN-GW is not directly aware of its result since the procedure implies a message exchange at the U-Plane level, where the ASN-GW implements only a routing function. Nevertheless the ASN-GW needs to know the status of the procedure since it has to perform some subsequent actions depending on that status. The method includes signalling the status via a signalling mechanism between the Access Service Network and the Connectivity Service Network, thus avoiding packet inspection at the U-plane by the Access Service Network Gateway.

9 Claims, 5 Drawing Sheets

SIGNALLING METHOD FOR COMMUNICATION NETWORKS, CORRESPONDING NETWORK, DEVICES AND COMPUTER PROGRAM PRODUCT

FIELD OF THE INVENTION

This disclosure relates to communication networks such as WiMAX (Worldwide Interoperability for Microwave Access) networks.

This disclosure was devised by paying specific attention to its possible use in networks supporting the CMIPv6 (Client Mobile IP version 6) function introduced as part of the Release 1.0 of the WiMAX Forum specification.

DESCRIPTION OF THE RELATED ART

In CMIPv6 R3 mobility binding is between a Mobile Station (MS) and a Home Agent (HA) and is handled via messages at the U-Plane level. Then only the MS and the HA are aware of BU (Binding Update)/BA (Binding Acknowledgement) status. A problem arises as to how the ASN becomes aware of the CMIPv6 binding state.

At present, in WiMAX networks supporting CMIPv6, the only possible way to solve this problem is ASN-GW (Access Service Network Gateway) packet inspection: ASN-GW does not know if the MS actually sent BU and if the BA has indicated success, unless it performs packet inspection in the U-Plane.

Then, in the currently adopted WiMAX solution, ASN-GW has to passively parse each U-Plane message to gain awareness of the status of BU/BA, both during Network Initiated R3 Re-Anchoring and Network Initiated Graceful Termination.

FIGS. 1 and 2 are chronograms representative of these procedures as described e.g. in WIMAX End-to-End Network Systems Architecture Stage 2: Architecture Tenets, Reference Model and Reference Points—release 1.0.0—Mar. 28, 2007; and WIMAX End-to-End Network Systems Architecture Stage 3: Architecture Tenets, Reference Model and Reference Points—release 1.0.0—Mar. 28, 2007

Specifically, FIG. 1 is representative of a CMIPv6 mobility event triggering a network-initiated R3 re-anchoring event.

The following reference numerals apply:
100 Mobile Station
102 Base Station
104 Intra Access Service Network (ASN) Functional Entity
106 Target Data Path Function (DPF)
108 Target Access Router (AR)
110 Serving Data Path Function
112 Serving Access Router (AR)
114 Home Agent (HA)
116 New Care-of Address (CoA).

The following events/transactions are effected in sequence:
1000 Old ASN Data Path Function information exchanged between Base Station 102 and serving DPF 110
1002 Anchor DPF relocate request sent from Entity 104 to Target AR 108
1004 Router Advertisement sent from Target AR 108 to Mobile Station 100 to produce the new CoA 116
1006 Binding Update (BU) sent from Mobile Station 100 with new CoA 116 to Home Agent 114
1008 Binding Acknowledgement (BA) sent back from home Agent 114 to Mobile Station 100
1010 passive parsing of BU/BA at Target AR 108
1012 Anchor DPF Relocate Response sent from Target AR 108 to Entity 104
1014 Relocate CNF (Configuration—File Name Extension) sent from Entity 104 to Target AR 108
1016 ASN Data Path information exchanged between Base Station 102 and Target DPF 106
1018 base station 102 and Serving DPF 110 proceed to removing old ASN Data Path Function.

FIG. 2 is representative of a CMIPv6 network-initiated "graceful" termination.

The following reference numerals apply:
100 Mobile Station
114 Home Agent (HA)
118 Access Router
120 Access Router Data Path (DP).

The following events/transactions are effected in sequence:
1020 R3 session release request sent from Access router DP 120 to Access Router 118
1022 Mobility Advertisement (with lifetime=0) sent from Access Router 118 to Mobile Station 100
1024 Binding Update (with lifetime=0) sent from Mobile Station 100 to Home Agent 114
1026 Binding Acknowledgement (with lifetime=0) sent from Home Agent 114 to Mobile Station 100.
1028 Passive parsing of BU/BA at Access Router 118
1030 R3 session release reply sent from Access Router 118 to Access Router DP 120.

In the scenario portrayed in FIGS. 1 and 2 the Access Service Network Gateway (ASN-GW) has to be aware of this binding status for several reasons, for example in order to start the release of the R4 tunnel between the Serving and Target ASN-GWs.

OBJECT AND SUMMARY OF THE INVENTION

The preceding description of the related art indicates that the need is felt for improved solutions enabling a communication network, such as e.g. a WiMAX network, to become aware of the status of a procedure to be performed therein by avoiding the shortcomings of the procedures discusses in the foregoing. Exemplary of this situation is making an ASN-GW (Access Service Network Gateway) aware of BU (Binding Update)/BA (Binding Acknowledgement) status by avoiding ASN-GW packet inspection in the U-Plane.

The object of the invention is thus to provide a satisfactory response to that need.

According to the present invention, such an object is achieved by means of a method having the features set forth in the claims that follow.

The invention also relates to a corresponding network, and to devices for use therein as well as to related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

An embodiment of the arrangement described herein is thus a mechanism that allows a network to become aware of the status of a procedure, making use of a newly defined signalling mechanism.

An embodiment applies to WiMAX networks, in particular to networks supporting CMIPv6.

An embodiment of the arrangement described herein allows an Access Service Network Gateway (ASN-GW) to become aware of BU(Binding Update)/BA (Binding Acknowledgement) status making use of signalling mechanisms between the Access Service Network (ASN) and the Connectivity Service Network (CSN).

In an embodiment, the CSN sends specific signalling messages to ASN-GW, informing it of the success of the mobility binding procedure.

In an embodiment, a Home Agent (HA) informs the Authentication, Authorization and Account (AAA) function (e.g. an AAA server), the AAA function informs the ASN-GW authenticator, the ASN-GW authenticator informs the new anchor ASN-GW Data Path Function (DPF) and the new anchor ASN-GW DPF informs the old anchor ASN-GW DPF; otherwise the ASN-GW authenticator informs the old anchor ASN-GW Data Path Function (DPF) and the old anchor ASN-GW Data Path Function (DPF) informs the new anchor ASN-GW DPF.

In an embodiment, in the case of a network-initiated R3 Re-Anchoring procedure, once a new binding with HA is created (after a successful exchange of BU/BA messages), the HA shall send Accounting Request Stop/Start (i.e. Access Request) messages to the AAA (due to the modification of the ongoing mobility binding). After the response towards HA, AAA will send a RADIUS Disconnect Request message to the Authenticator GW asking for releasing all the needed resources.

In an embodiment, in the case of CMIPv6 Network Initiated Graceful Termination, the MS sends a binding update with lifetime=0 to the HA. Upon the successful deletion of mobility binding with the MS, the Accounting Client in HA shall send an Accounting Request Stop message to the AAA. After the response towards HA, AAA will send a RADIUS Disconnect Request message to the Authenticator GW asking for releasing all the needed resources.

Embodiments of the arrangement described herein are applicable to ASN and CSN in case of CIMv6 support. In particular, depending on the signalling method used, ASN-GW, HA and AAA may be involved in implementing the arrangement described herein.

BRIEF DESCRIPTION OF THE ANNEXED VIEWS

The invention will now be described, by way of example only, with reference to the enclosed figures of drawing, wherein:

FIGS. 1 and 2 have been already described in the foregoing;

DETAILED DESCRIPTION OF PREFERRED EMBODIMENTS

In the following description, numerous specific details are given to provide a thorough understanding of embodiments.

The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The following is a list of acronyms used throughout this description with an explanation of the respective meanings. These meanings (and the meaning of any other acronym appearing in this description) are otherwise well known to those of skilled in the art.

Figure 1:
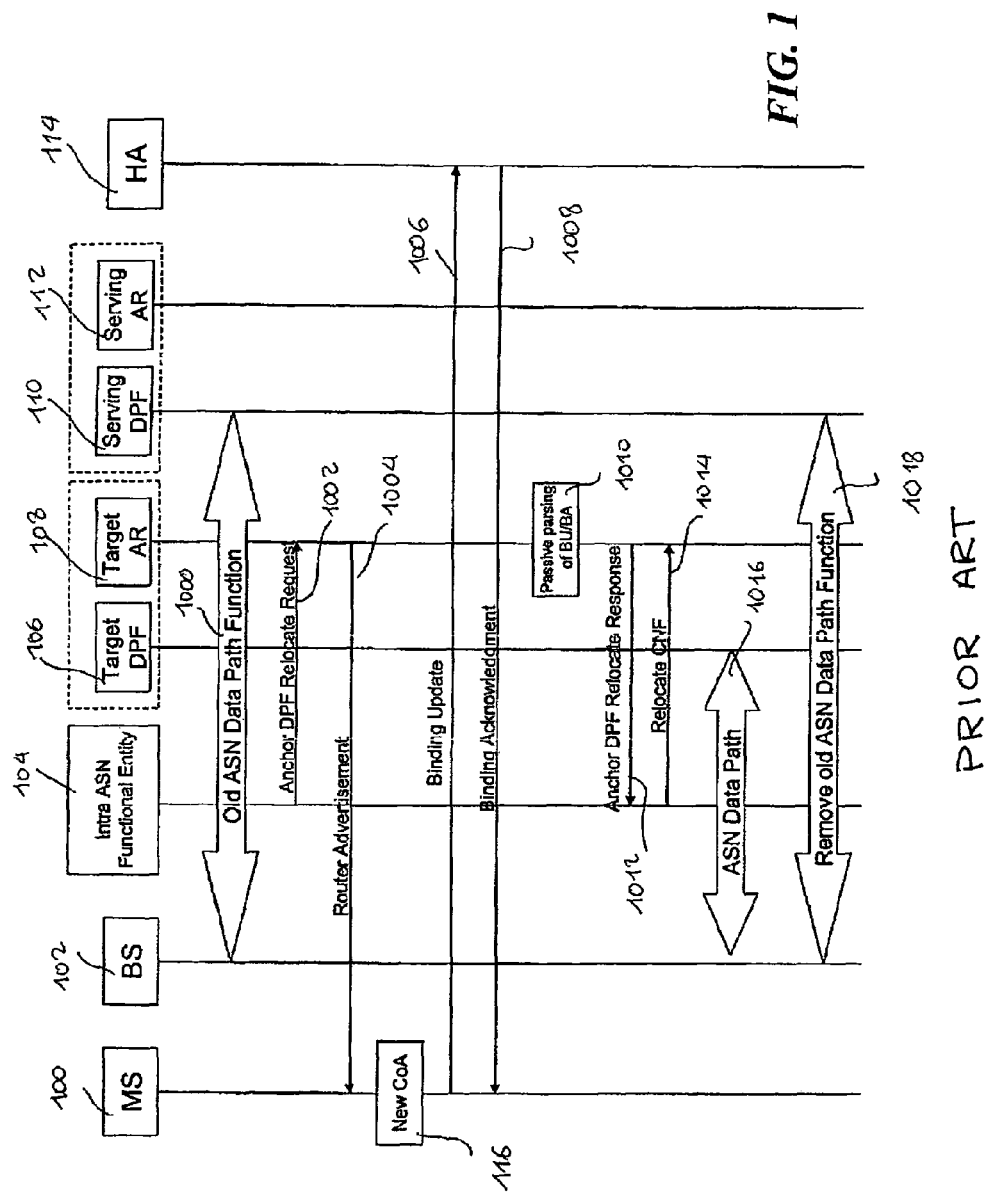
Figure 2:
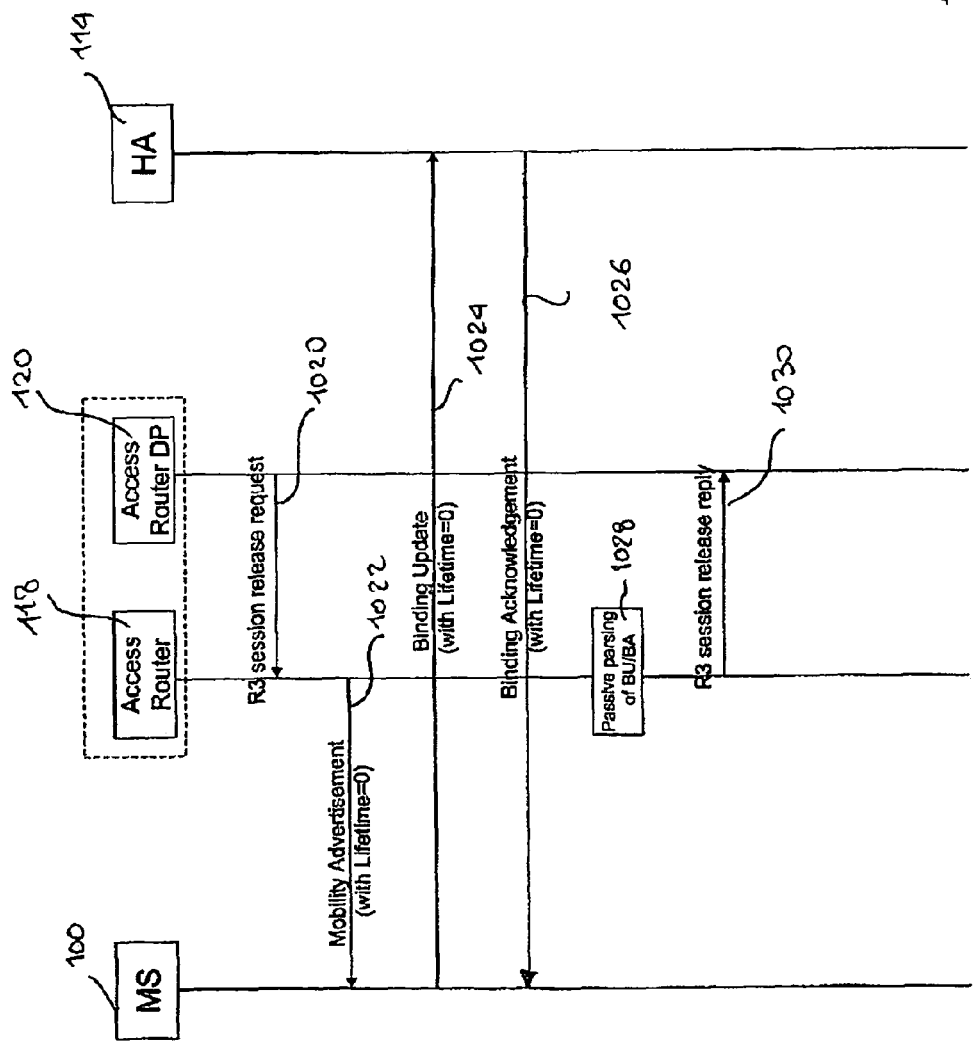
Figure 4:
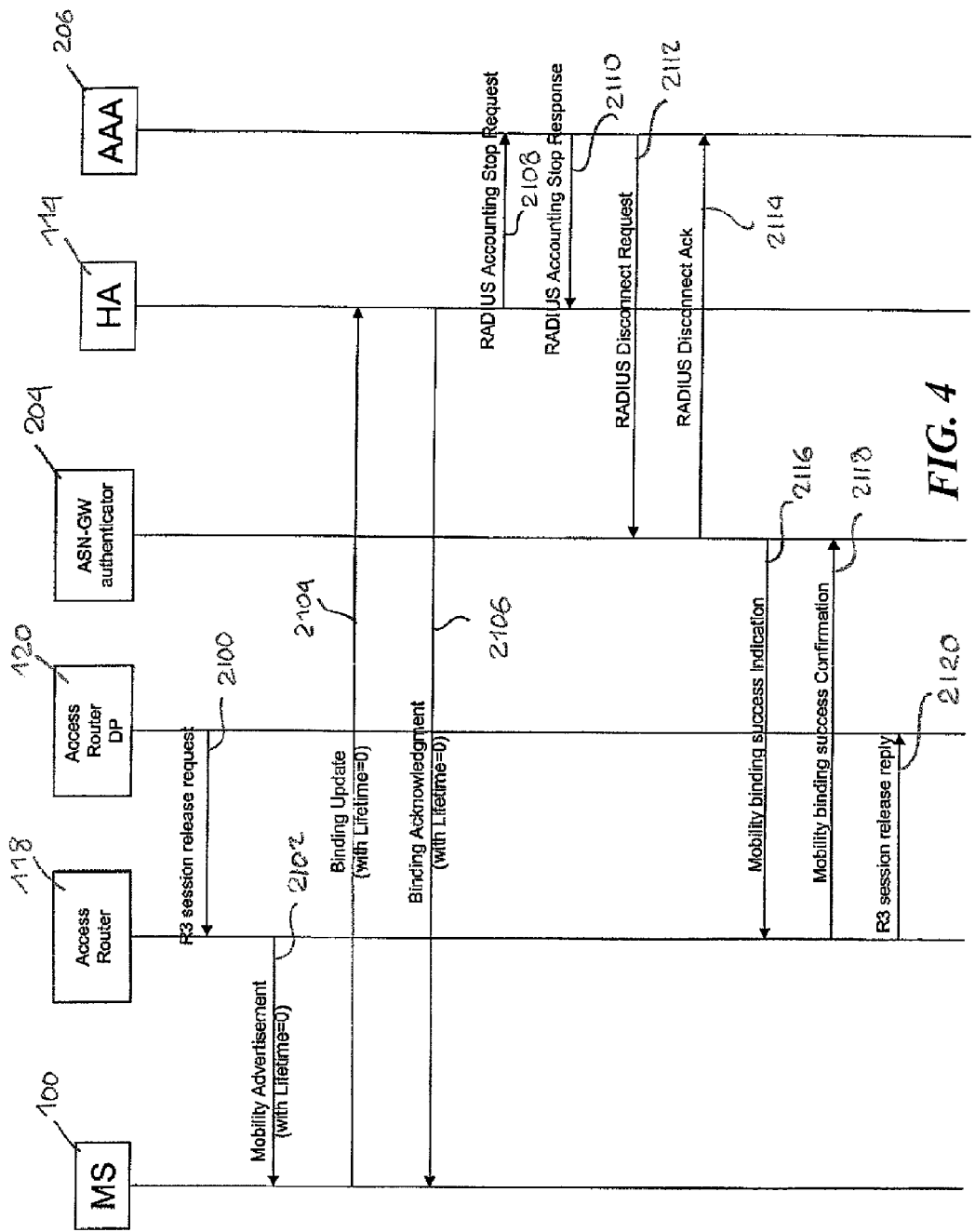
FIG. 4 is a chronogram representative of a CMIPv6 network-initiated graceful termination according to the arrangement described herein.
Figure 5:
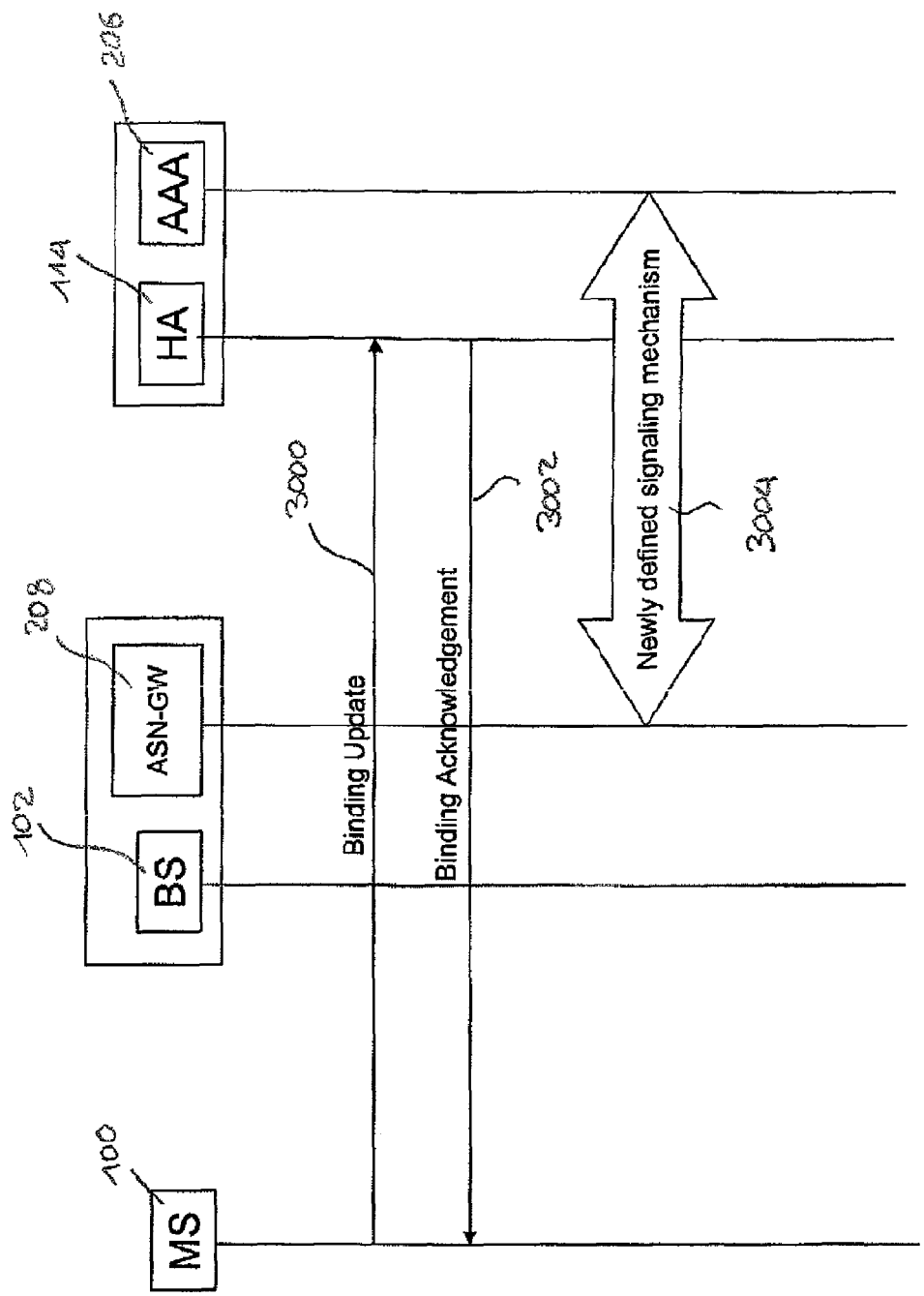
FIG. 5 is generally representative of a signalling mechanism according to the arrangement described herein.

This list is provided solely by way of immediate reference.
AAA Authentication, Authorization and Accounting
Acct Accounting
ACK ACKnowledge
ASN Access Service Network
ASN-GW Access Service Network Gateway
BA Binding Acknowledgement
BU Binding Update
CMIPv6 Client Mobile IP version 6
CSN Connectivity Service Network
DPF Data Path Function
GW GateWay
HA Home Agent
ID IDentifier
IPv6 Internet Protocol version 6
MS Mobile Station
NACK Not ACK
RADIUS Remote Access Dial-In User Service
WiMAX Worldwide Interoperability for Microwave Access Throughout FIGS. 3 to 5, parts, elements, and/or entities identical or equivalent to parts, elements, and/or entities already described in connection with FIGS. 1 and 2 are indicated with the same reference numerals already appearing in FIGS. 1 and 2. Conversely, events/transactions depicted in FIGS. 3 to 5 are indicated by way of orderly description with new reference numerals even though certain events/transactions as depicted in FIGS. 3 to 5 may in fact be identical or equivalent events/transactions depicted in FIGS. 1 and 2.

Figure 3:
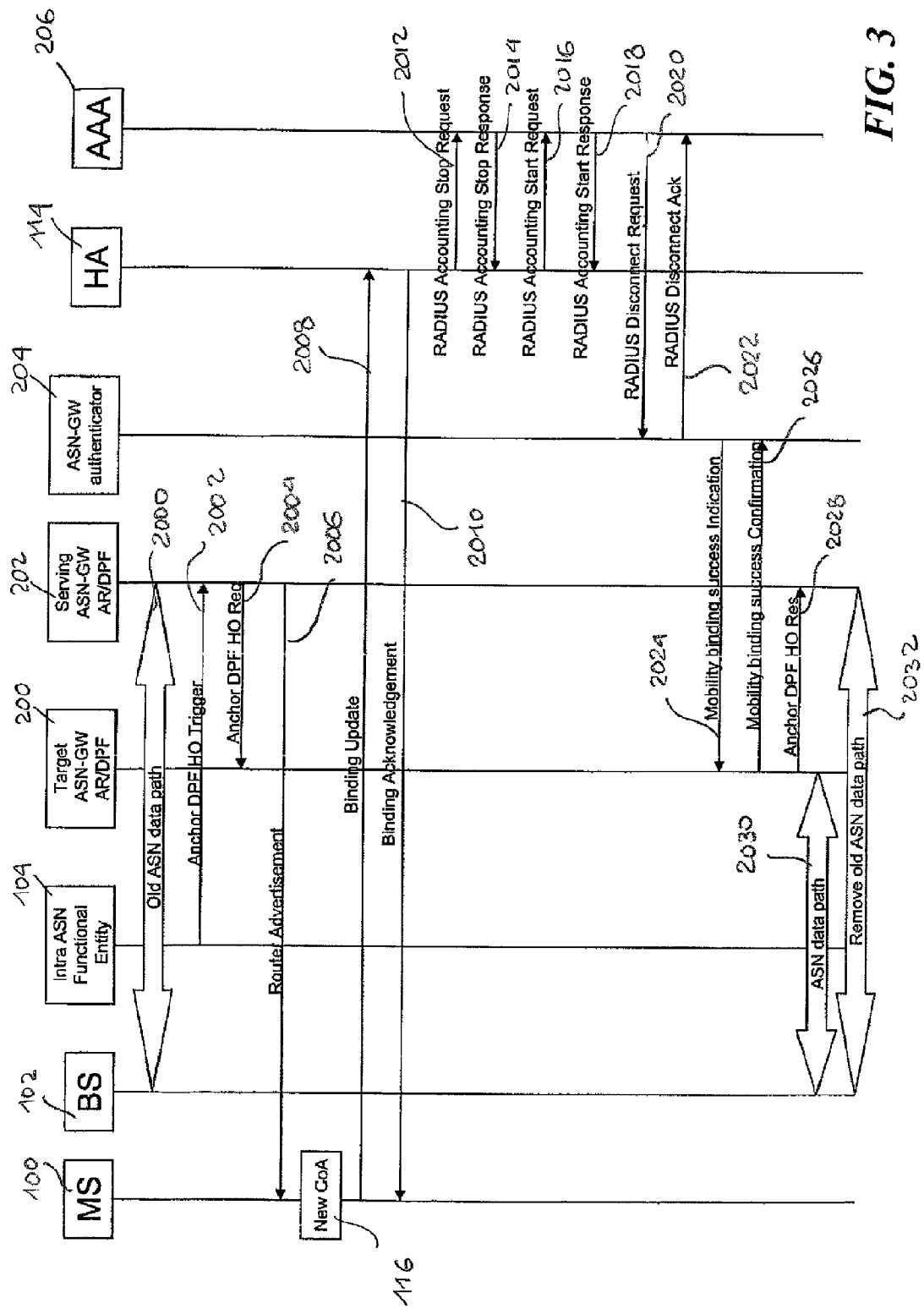
FIG. 3 is a chronogram representative of a CMIPv6 mobility event triggering a network-initiated R3 re-anchoring event according to the arrangement described herein.

FIG. 3 is representative of an exemplary CMIPv6 mobility event triggering a network-initiated R3 re-anchoring event according to the arrangement described herein.

The following reference numerals apply:
100 Mobile Station
102 Base Station
104 Intra Access Service Network (ASN) Functional Entity
114 Home Agent (HA)
116 New Care-of Address (CoA).
200 Target ASN-GW Access Router (AR)/DPF
202 Serving ASN-GW Access Router (AR)/DPF
204 ASN-GW authenticator
206 Authentication, Authorization and Accounting (AAA) function (e.g. AAA server).

The following events/transactions are effected in sequence:

2000 Old ASN Data Path Function information exchanged between Base Station 102 and serving ASN-GW/DPF 110

2002 Anchor DPF HO (Hand-Over) Trigger sent from Entity 104 to serving ASN-GW AR/DPF 202

2004 Anchor DPF HO (Hand-Over) Request sent from serving ASN-GW AR/DPF 202 to Target ASN-GW AR/DPF 200

2006 Router Advertisement sent from serving ASN-GW AR/DPF 202 to Mobile Station 100 to produce the new CoA 116

2008 Binding Update (BU) sent from Mobile Station 100 with new CoA 116 to Home Agent 114

2010 Binding Acknowledgement (BA) sent back from Home Agent 114 to Mobile Station 100

2012 RADIUS Accounting Stop Request sent from Home Agent 114 to AAA 206

2014 RADIUS Accounting Stop Response sent from AAA 206 to Home Agent 114

2016 RADIUS Accounting Start Request sent from Home Agent 114 to AAA 206

2018 RADIUS Accounting Start Response sent from AAA 206 to Home Agent 114

2020 RADIUS Disconnect Request sent from AAA 206 to ASN-GW authenticator 204

2022 RADIUS Disconnect ACK sent from ASN-GW authenticator 204 to AAA 206

2024 Mobility binding success Indication sent from ASN-GW authenticator 204 to Target ASN-GW AR/DPF 200

2026 Mobility binding success Confirmation sent from Target ASN-GW AR/DPF 200 to ASN-GW authenticator 204

2028 Anchor DPF HO Response sent from Target ASN-GW AR/DPF 200 to serving ASN-GW/DPF 202

2030 ASN Data Path information exchanged between Base Station 102 and Target ASN-GW AR/DPF 200

2030 Base Station 102 and Serving ASN-GW AR/DPF 204 proceed to removing old ASN Data Path Function.

Those of skill in the art will appreciate that the chronogram of FIG. 3 and all the chronograms described herein are an illustrative (i.e. not mandatory) schematic representation of a sequence of steps/operations.

Just to make an example, the Anchor DPF HO Request step 2004 preceding the Router Advertisement step 2006 of FIG. 3 may in fact involve an Anchor DPF HO Request being sent first from the Authenticator ASN-GW HO to the Serving ASN-GW HO and in turn from the Serving ASN-GW HO to the Target ASN-GW HO, followed by a trigger being sent from the Target ASN-GW HO to the Target ASN-GW AR. As a further example, the RADIUS messages 2012-2018 may be replaced by an Access Request message sent from sent from Home Agent 114 to AAA 206 and by an Access Accept message sent from AAA 206 to HA 104. Also, the Mobility binding success Indication/Confirmation messages 2024-2026 can take the form of a "Context_rpt" message sent by the Authenticator to the serving ASN-GW, which message is then forwarded to the target ASN-GW. The exemplary names attributed to the messages within the framework of this description are for convenience and ease of description and understanding only and do not interpret the scope or meaning of the embodiments.

Along the same lines, FIG. 4 is representative of an exemplary CMIPv6 network-initiated "graceful" termination according to the arrangement described herein.

The following reference numerals apply:
100 Mobile Station
114 Home Agent (HA)
118 Access Router
120 Access Router Data Path (DP).
204 ASN-GW authenticator
206 Authentication, Authorization and Accounting (AAA).

The following events/transactions are effected in sequence:

2100 R3 session release request sent from Access router DP 120 to Access Router 118

2102 Mobility Advertisement (with lifetime=0) sent from Access Router 118 to Mobile Station 100

2104 Binding Update (with lifetime=0) sent from Mobile Station 100 to Home Agent 114

2106 Binding Acknowledgement (with lifetime=0) sent from Home Agent 114 to Mobile Station 100

2108 RADIUS Accounting Stop Request sent from Home Agent 114 to AAA 206

2110 RADIUS Accounting Stop Response sent from AAA 206 to Home Agent 114

2112 RADIUS Disconnect Request sent from AAA 206 to ASN-GW authenticator 204

2114 RADIUS Disconnect ACK sent from ASN-GW authenticator 204 to AAA 206

2116 Mobility binding success Indication sent from ASN-GW authenticator 204 to Access Router 118

2118 Mobility binding success Confirmation sent from Access Router 118 to ASN-GW authenticator 204

2120 R3 session release reply sent from Access Router 118 to Access Router DP 120.

FIG. 5 is a higher level, generalized representation of the signalling mechanism between Access Service Network (ASN) and Connectivity Service Network (CSN) as described herein.
The following reference numerals apply:
100 Mobile Station
102 Base Station BS
114 Home Agent (HA)
206 Authentication, Authorization and Accounting (AAA)
208 Access Service Network Gateway (ASN-GW)

Reference numerals 3000 and 3002 are representative of Binding Update (BU) information sent from the Mobile Station 100 to the home Agent 114 and Binding Acknowledgement (BA) information sent from the home Agent 114 to the Mobile Station 100, respectively.

The double arrow designated 3004 is generally representative of the new signalling mechanism as described herein.

The arrangement described herein is thus representative of a mechanism allowing an ASN-GW to become aware of BU/BA status, making use of signalling mechanisms between ASN and CSN. One of the advantages is that this signalling mechanisms allow the ASN-GW to avoid parsing each U-Plane message, then saving extensive capacity resources.

Still in compliance with the arrangement exemplified herein, different signalling flows could be used to solve this problem, the basic idea underlying this arrangement being to allow the CSN to send specific signalling messages to the ASN-GW, informing it of the success of the mobility binding procedure.

An efficient embodiment is the one where the status of BU/BA exchange is realized in a circular way: the Home Agent (HA) informs the AAA (Authentication, Authorization and Accounting) function, the AAA function informs the ASN-GW authenticator, the ASN-GW authenticator informs the new anchor ASN-GW DPF and the new anchor ASN-GW DPF informs the old anchor ASN-GW DPF.

So in this embodiment the problem is basically solved by signalling the status of BU/BA to ASN-GW authenticator through the AAA function.

Following this approach in case of a Network Initiated R3 Re-Anchoring (as exemplified in FIG. 3), once a new binding with the Home Agent (HA) is created (after a successful exchange of BU/BA messages), the HA shall send Accounting Request Stop/Start (i.e. Access Request) messages to the AAA function (due to the modification of the ongoing mobility binding). After the response towards HA, the AAA function will send a RADIUS Disconnect Request message to the Authenticator GW asking for releasing all the needed resources.

Similarly, in case of CMIPv6 Network Initiated Graceful Termination (as exemplified in FIG. 4), the MS sends a binding update with lifetime=0 to the HA. Upon the successful deletion of mobility binding with the MS, the Accounting Client in HA shall send an Accounting Request Stop message to the AAA. After the response towards HA, AAA will send a RADIUS Disconnect Request message to the Authenticator GW asking for releasing all the needed resources.

The arrangement described herein would work even if the Home Agent does not really do accounting, since the function of accounting inside HA is an optional feature also in case of IPv6 support (HA could send just the STOP message as a trigger with AAA-Session-ID and some appropriate Acct-Terminate-Cause value).

This RADIUS disconnect feature would use the existing format of RADIUS disconnect request and response messages. The code field used in disconnect messages would have three different codes: Disconnect-Request (40), Disconnect-ACK (41), Disconnect-NAK (42). For differentiating between the two different use cases reported above (R3 re-anchoring and graceful network exit) new RADIUS VSAs may be introduced to be used in the RADIUS Disconnect messages sent to the authenticator. Each RADIUS Client is already able to receive and to process unsolicited disconnect requests from RADIUS servers: the disconnect response will be either a Disconnect-ACK or a Disconnect-NAK, depending on the status of the disconnection procedure.

Of course, other signalling methods may be possible.

For instance, using "Access Request" messages between HA and AAA in the R3 re-anchoring procedure is enough for differentiating between R3 re-anchoring and graceful network exit.

However the arrangement illustrated here, even if somewhat convoluted, is a complete circle and it appears as a clean solution. In addition it allows avoiding major impacts on the existing implementations.

The arrangement described herein is applicable to ASN and CSN in case of CIMv6 support; in particular, depending on the signalling method used, ASN-GW, HA and AAA may be involved in implementing the invention.

Without prejudice to the underlying principles of the invention, the details and the embodiments may vary, even appreciably, with reference to what has been described by way of example only, without departing from the scope of the invention as defined by the annexed claims.

The invention claimed is:

1. A method comprising:
    implementing a signalling mechanism between an Access Service Network and a Connectivity Service Network in a communication network;
    signalling a status of a mobility binding procedure between a Mobile Station and a Home Agent in said communication network with said signalling mechanism, said status including Binding Update and Binding Acknowledgement status; and
    allowing the Connectivity Service Network to send specific signalling messages to an Access Service Network Gateway to inform said Access Service Network Gateway of the status of the mobility binding procedure, and to allow said Access Service Network Gateway to avoid parsing each U-plane message between said Mobile Station and said Home Agent to obtain said status of said mobility binding procedure.

2. The method of claim 1, wherein said mobility binding procedure is handled via messages at an U-Plane level, the method including the operation of omitting packet inspection at the U-plane level by said Access Service Network Gateway.

3. The method of claim 1, including said Connectivity Service Network sending to said Access Service Network Gateway signalling messages confirming success of said mobility binding procedure.

4. The method of claim 1, wherein said Connectivity Service Network includes said Home Agent and an Authentication, Authorization and Accounting function and said Access Service Network includes an Access Service Network Gateway authenticator, said signalling mechanism including said Home Agent informing said Authentication, Authorization and Accounting function, said Authentication, Authorization and Accounting function informing said Access Service Network Gateway authenticator.

5. The method of claim 4, wherein said mobility binding procedure involves passing from an old anchor Access Service Network Gateway Data Path Function to a new anchor Access Service Network Gateway Data Path Function, the method further including:
    said Access Service Network Gateway authenticator informing one out of said old and new anchor Access Service Network Gateway Data Path Functions, and
    said one of said old and new anchor Access Service Network Gateway Data Path Functions informing the other of said old and new anchor Access Service Network Gateway Data Path Functions.

6. The method of claim 4, wherein said mobility binding procedure is a Network-Initiated R3 Re-Anchoring procedure, the method including: once a new binding with said Home Agent is created, said Home Agent sending Access Request messages to said Authentication, Authorization and Accounting function, said Authentication, Authorization and Accounting function sending a RADIUS Disconnect message to said Access Service Network Gateway authenticator, asking that all resources needed are released.

7. The method of claim 4, wherein said mobility binding procedure is a Network-Initiated Graceful Termination between said Mobile Station and said Home Agent, the method including: said Mobile Station sending to said Home Agent a binding update message with a lifetime equal to zero upon deletion of mobility binding with said Mobile Station, the Accounting Client in said Home Agent sending to said Authentication, Authorization and Accounting function an Accounting Request Stop message, and said Authentication, Authorization and Accounting function sending to said Access Service Network Gateway authenticator a RADIUS Disconnect Request message, asking that all resources needed are released.

8. A computer program product comprising a non-transitory computer-readable storage medium bearing computer program code embodied therein for use with a computer, the computer program code comprising code for performing the following:

implementing a signalling mechanism between an Access Service Network and a Connectivity Service Network in a communication network;

signalling a status of a mobility binding procedure between a Mobile Station and a Home Agent in said communication network with said signalling mechanism, said status including Binding Update and Binding Acknowledgement status; and allowing the Connectivity Service Network to send specific signalling messages to an Access Service Network Gateway to inform said Access Service Network Gateway of the status of the mobility binding procedure, and to allow said Access Service Network Gateway to avoid parsing each U-plane message between said Mobile Station and said Home Agent to obtain said status of said mobility binding procedure.

9. An apparatus comprising:

one or more processors; and one or more memories including computer program code, the one or more memories and the computer program code configured, with the one or more processors, to cause the apparatus to perform at least the following:

implementing a signalling mechanism between an Access Service Network and a Connectivity Service Network in a communication network;

signalling a status of a mobility binding procedure between a Mobile Station and a Home Agent in said communication network with said signalling mechanism, said status including Binding Update and Binding Acknowledgement status; and allowing the Connectivity Service Network to send specific signalling messages to an Access Service Network Gateway to inform said Access Service Network Gateway of the status of the mobility binding procedure, and to allow said Access Service Network Gateway to avoid parsing each U-plane message between said Mobile Station and said Home Agent to obtain said status of said mobility binding procedure.

* * * * *